United States Patent [19]

Eggert, Jr.

[11] 4,359,239

[45] Nov. 16, 1982

[54] UNDERRIDE DEVICE FOR A TRAILER OR TRUCK

[75] Inventor: Walter S. Eggert, Jr., Huntington Valley, Pa.

[73] Assignee: The Budd Company, Troy, Mich.

[21] Appl. No.: 216,247

[22] Filed: Dec. 15, 1980

[51] Int. Cl.³ .................... B60R 19/02; B60R 21/14
[52] U.S. Cl. ............................ 293/132; 280/784; 296/183
[58] Field of Search ............... 280/784; 296/188, 189, 296/181, 183; 293/103, 131, 133, 132, 155

[56] References Cited

U.S. PATENT DOCUMENTS

| | | | |
|---|---|---|---|
| 3,717,223 | 2/1973 | Alfes | 293/133 |
| 3,847,427 | 11/1974 | Eshelman | 293/131 |
| 3,913,963 | 10/1975 | Persicke | 293/131 |
| 3,927,730 | 12/1975 | Winslow | 280/784 |
| 4,247,138 | 1/1981 | Child | 293/103 |

FOREIGN PATENT DOCUMENTS 2213323 9/1972 Fed. Rep. of Germany ...... 293/133

*Primary Examiner*—Joseph F. Peters, Jr.
*Assistant Examiner*—John A. Carroll
*Attorney, Agent, or Firm*—Edward M. Farrell; Thomas I. Davenport; Herman Foster

[57] ABSTRACT

A guard beam is disposed below the bottom of the rear end of a trailer or truck. Energy absorbing members are connected between the trailer and the guard beam. When impact forces applied to the guard beam exceed predetermined minimum levels, the guard beam collapses and energy is absorbed in the absorbing members during the collapse of the beam.

6 Claims, 5 Drawing Figures

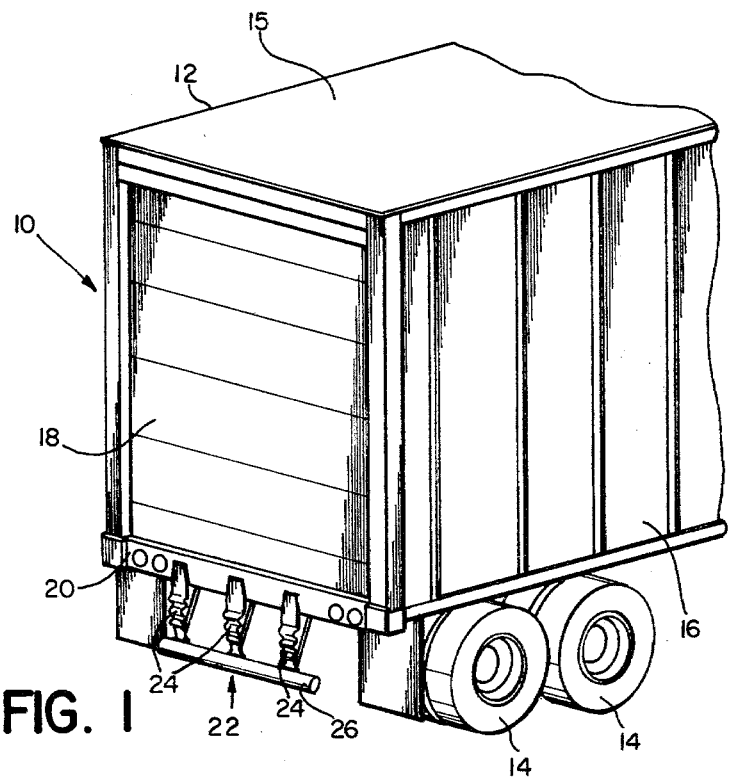
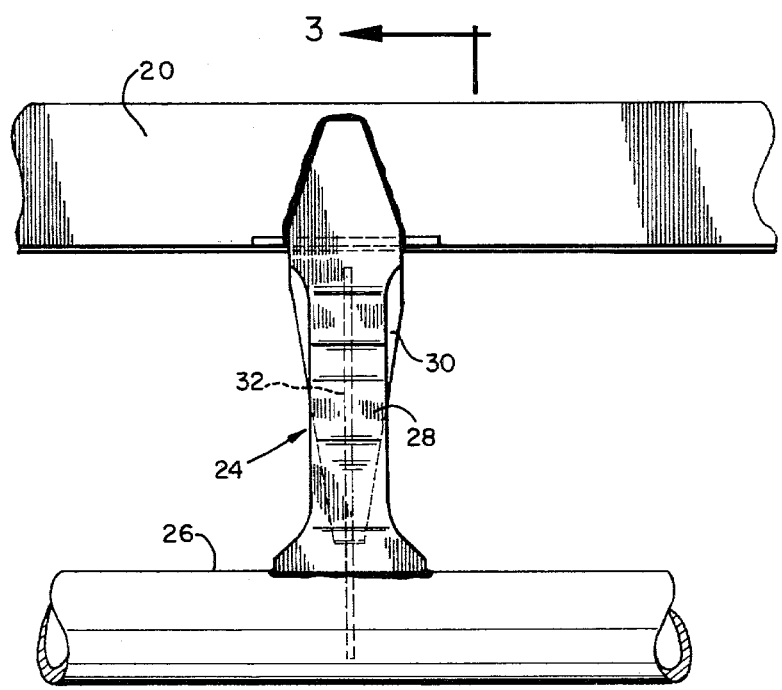

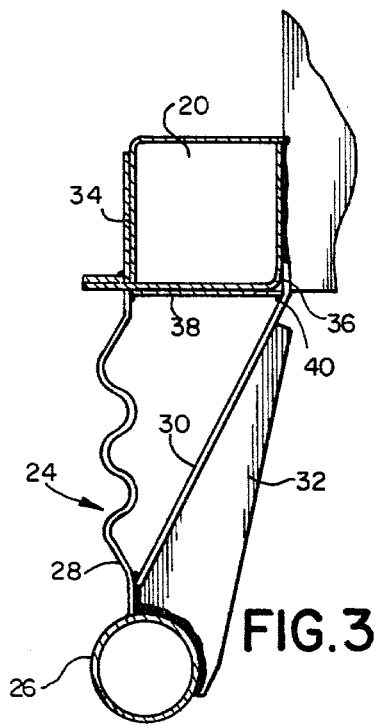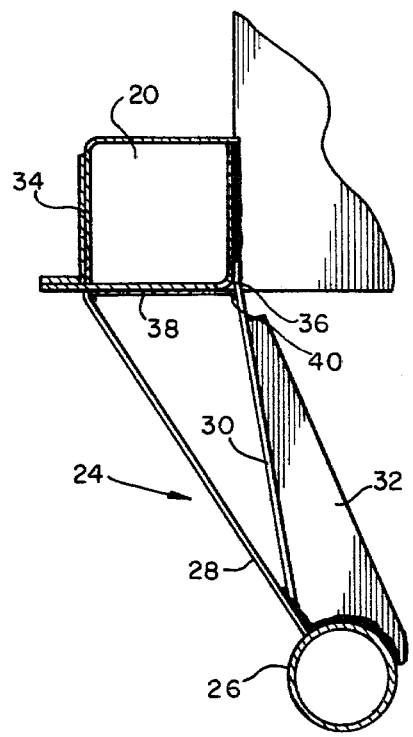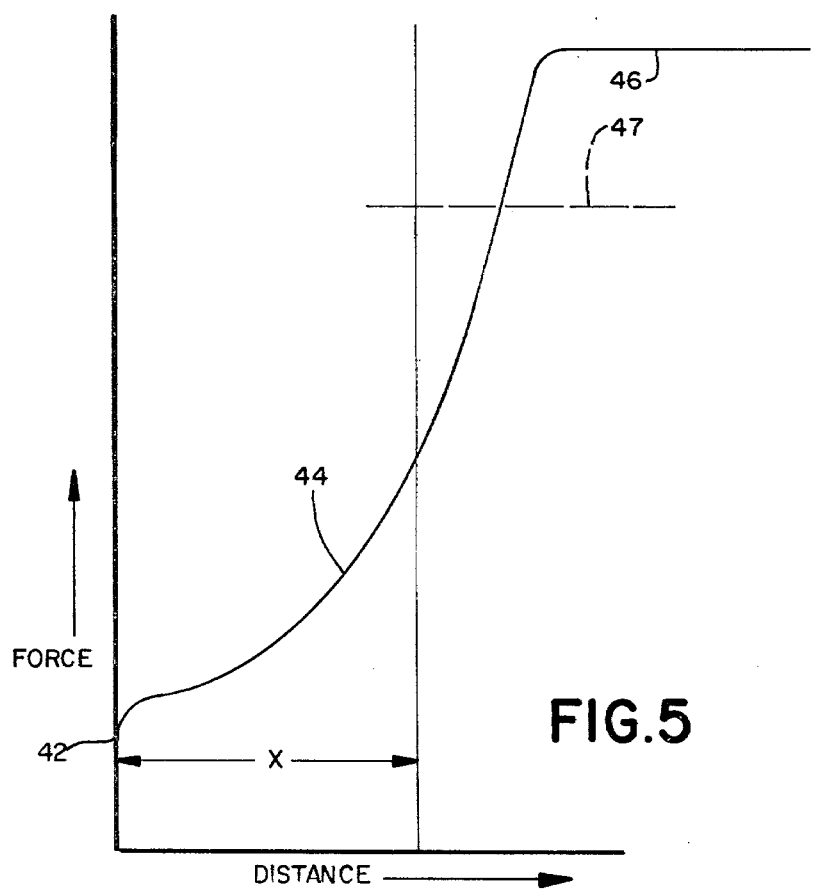

UNDERRIDE DEVICE FOR A TRAILER OR TRUCK

BACKGROUND OF THE INVENTION

Automobile crashes into the rear end of trucks and trailers often result in deaths or serious injuries to the automobile occupants. Many such deaths and injuries are due to the impacting automobile underriding the rear end of the trailers or trucks.

While relatively stiff vertical guard members may be extended downwardly from the rear of a trailer to prevent underride, such stiff members, if impacted by an oncoming automobile, result in much of the force being transmitted back to the occupants of the automobile. It is desirable that the energy produced by an automobile impacting the rear of a trailer be absorbed or gradually reduced as the automobile and its occupants are slowed down.

In the past, automobile frontal front elements have been used to provide a controlled energy absorbing crush upon impact.

OBJECTS OF THE INVENTION

It is an object of this invention to provide improved means for minimizing death or injury to automobile occupants due to an impacting vehicle underriding the rear end of a truck or trailer.

It is a further object of this invention to provide an improved means for absorbing energy produced by an impacting vehicle underriding the rear end of a truck or trailer.

It is still a further object of this invention to provide an improved energy absorbing rear guard for a truck or trailer wherein the weight and cost are minimized.

BRIEF SUMMARY OF THE INVENTION

In accordance with the present invention, an underride device for a trailer includes a guard beam transversely disposed beneath the rear end of the trailer. Energy absorbing means including corrugated members and reinforcement members are connected between the guard beam and the trailer. When impact forces against the guard beam beneath the trailer exceed predetermined levels, the corrugated members elongate and tend to become straight and the reinforcement members collapse absorbing some of the impact energy as they do so.

Other objects and advantages of the present invention will be apparent and suggest themselves to those skilled in the art, from a reading of the following specification and claims, taken in conjunction with the accompanying drawings.

BRIEF DESCRIPTION OF THE DRAWINGS

FIG. 1 is an isometric view of energy absorbing underride apparatus secured to a trailer, in accordance with the present invention;

FIG. 2 is an enlarged view of a portion of the energy absorbing underride apparatus illustrated in FIG. 1;

FIG. 3 is a view taken along lines 3—3 of FIG. 2, illustrating a portion of the underride apparatus prior to impact;

FIG. 4 is a view similar to FIG. 3 illustrating a portion of the underride apparatus after impact; and FIG. 5 is a curve illustrating generally the forces applied versus distance moved of the underride apparatus as it collapses during impact.

DESCRIPTION OF THE INVENTION

Referring to FIG. 1, the typical trailer 10 includes a container 12 supported by wheels 14. The container 12 includes a conventional roof 15, side walls 16 and a rear wall including a door 18. A conventional floor not illustrated is included in the container. A support beam 20 is connected to the rear of the bottom of the trailer 10. The beam 20 may be an extension of the floor of the trailer or may be a separate element added to the trailer for the purpose of supporting underride apparatus 22, especially if retro-fitting is involved.

The underride apparatus 22 is connected below the normal floor level of the trailer 10. The purpose of the apparatus 22 is to resist the penetration of an automobile or other vehicle beneath the trailer in the event of rear impact. As will be described, the apparatus 22 prevents or controls the degree of penetration of an impacting automobile beneath the floor of the trailer and absorbs energy while doing so. The apparatus 22 serves as a guard device which assists in minimizing the likelihood of death or serious injury to occupants of an automobile impacting against the rear of the trailer 10.

The apparatus 22 is not a stiff guard, but is capable of collapsing in a controlled manner so as to absorb energy when the forces against the apparatus exceed predetermined minimum levels. Because these energies or forces are absorbed, they are not transmitted through the impacting automobile back to the occupants thereof.

The underride apparatus 22 comprises a plurality of spaced components 24 connected between the support beam 20 and a guard beam 26, which may comprise a tubular member. As will be described, the spaced components 24 may each comprise a number of members which are welded together.

Referring to FIGS. 2, 3 and 4, along with FIG. 1, one of the components 24 is illustrated. The individual components 24 may comprise a number of separate elements or members including a corrugated sheet element 28, a rear angularly disposed plate element 30, and a reinforcement plate or section 32 which is perpendicularly and centrally connected to the plate element 30. The three parts 28, 30 and 32 are welded together and may be considered as a single component during a collapsing operation. The component 24 including all of its integral parts are welded or otherwise secured to the tubular member or guard beam 26. The corrugated section or part 28 includes an end straight section 34 which is welded to the beam 26. The angular section 30 includes a top portion 36 which is secured to the rear area of the support beam 20. A bottom plate 38 is secured to the bottom of the support beam 20. The tops of the corrugated element 28 and the angular element 30 are welded to the plate 38 which is suitably secured to the beam 20. Reinforcement element 32 is secured to the section 38.

All the parts making up the component 24 are preferably made of metal. The element 28 is capable of being stretched when subjected to forces at the ends thereof which exceed predetermined designed minimum levels. The element 30 is dimensioned to operate as a hinge about the pivot point 40 where the element 30 is welded to the bottom plate 38. The element 30 in effect acts as a plastic hinge and is disposed to move forwardly when forces are applied thereto.

The bottom portion of the element 32 is arcuate in shape to conform to the shape of the tubular member 26 to permit the component 24 to be securely welded to the tubular member 26.

The position of the component 24 in its normal position is illustrated in FIG. 3. Upon rear impact by an automobile against the guard beam 26, certain actions and reactions occur depending upon the magnitude of the rear impact forces. The structure involving the component 24 including the parts 28, 30 and 32 are such as to withstand a certain amount of impact, as for example when the trailer 10 impacts against a loading platform. However, if the impact forces against the guard beam 26 exceeds predetermined minimum levels, as determined by the dimensions and other characteristics of the parts 28, 30 and 32, the guard beam 26 will tend to move under the floor of the trailer 10. If the impact is of sufficient magnitude, the apparatus illustrated in FIG. 2 will move to the position illustrated in FIG. 4.

When the impact forces are relatively high, the beam 26 will tend to move about a small arc towards the right to the position illustrated in FIG. 4. The element 30 will tend to pivot about the point 40. The element 32 will move along with the element 30 and the beam 26. As the beam 26 moves to the right in a slightly arcuate direction, the corrugated element 28 will tend to elongate or straighten. The element 28, when elongated sufficiently, will tend to assume a straight position as illustrated in FIG. 4. When the element 28 is completely elongated and all of the corrugations are removed, the entire member or assembly 24 will remain fixed as illustrated in FIG. 4. This position assumes that the impact forces are not of a tremendous nature sufficient to start a collapse of the rear end of the trailer.

During an impact of an automobile against the beam 26, a certain amount of energy is absorbed as the corrugated element 28 tends to elongate or stretch. Consequently, much of the energy resulting from the impact will not be retransmitted back to the occupants of the automobile. The energy absorption takes place gradually as the car rides under the trailer. In many cases, in an ideal situation, a substantial amount of the energy will be absorbed by the apparatus before it reaches the position illustrated in FIG. 4 or before a collapse of the rear end of the trailer.

It is noted that the energy absorbing apparatus 22 moves and absorbs energy gradually. A relatively stiff underride apparatus would tend to prevent the automobile from entering under the trailer and would tend to retransmit a tremendous amount of energy back to the occupants of the automobile causing injury or death. If a solid or stiff underride device were employed, the initial impact would be extremely high. The energy absorbing apparatus of the present invention eliminates this initial extremely high force by absorbing the initial impact and then gradually absorbing additional energy as the automobile penetrates beneath the trailer.

The forces applied resulting from impact and the distances moved by the energy absorbing apparatus are illustrated by a curve in FIG. 5. At the beginning of the curve 42, there is a certain amount of impact forces developed prior to the movement of the underride apparatus 22. No deflection or collapse of the apparatus 22 takes place in this area. Upon application of sufficient impact force, the apparatus 22 starts to yield, the corrugated element 28 starts to expand or straighten absorbing energy as it does so. The rate at which the amount of energy is controlled or absorbed during yielding of apparatus 22 is illustrated by a portion of the curve 44. The yielding of the apparatus increases up to a level 47 at which the corrugated elements 28 are fully expanded. Beyond this point, the rear end of the trailer is designed to collapse to continue the absorption of energy. At a certain penetration of the automobile and movement of the underride apparatus 28, a point 47 such as illustrated in FIG. 4, is reached in which the maximum amount illustrated by force 46 is absorbed. As mentioned, this is the area at which the apparatus will be broken away from the trailer and the automobile will not be controlled as far as the underride under the trailer is concerned.

The energy absorbing apparatus of the present invention provides reduced resistivity to impacting as it yields. The yielding is at a varying rate. The rate of yielding may be made variable and designed to accommodate reaction and forces involving different weights.

The number of corrugated elements and associated parts is dependent upon the particular design configuration and the amount of underride control desired. In considering such a design, it is desirable to consider the overall weight of the vehicle a well as its possible interference with the other parts of the vehicle, such as moving the bogie on and off below the container of the trailer. The materials used generally may be steel sheets about $\frac{1}{4}''$ to $\frac{1}{2}''$ thick. The tubular member may comprise a tube having a 6" outside diameter with a 5/16" wall. This tube may also be made of steel. The particular dimensions and materials used are again dependent upon the overall design characteritics and the results desired.

The underride apparatus illustrated is adaptable so that it may be connected to existing trailers. Thus, an overall redesign of the rear or bottom of the trailer is generally not necessary to incorporate the safety features described in connection with the present invention.

What is claimed is:

1. Anti-underride apparatus for a trailer and the like including a main body having a rear wall and floor comprising:
    (a) a support beam secured transversely to said main body below said floor and rear wall;
    (b) a guard beam spaced below said support beam; and
    (c) energy absorbing means fixedly secured between said support beam and said guard beam comprising a plurality of spaced corrugated components secured to the rearwardly facing portion of said support beam and extending substantially in a vertical plane between said support beam and said guard beam, a reinforcement component extending from the forwardly facing portion of said support beam and connected to said support beam and said guard beam and being capable of yielding adjacent said support beam for controlling movement of said guard beam, and;
    (d) said energy absorbing means having a predetermined level of resistance to forward movement of said guard beam upon application of force in a forwardly direction thereto.

2. Anti-underride apparatus as set forth in claim 1 wherein said corrugated elements expand in lengths and absorb energy when impact forces applied to said guard beam exceed predetermined levels.

3. Anti-underride apparatus as set forth in claim 2 wherein said reinforcement component comprises a plurality of inwardly extending angular elements each connected to one end towards the downwardly extending end of one of said corrugated elements and to said support beam at the other end.

4. Anti-underride apparatus as set forth in claim 3 wherein said plurality of angular elements each include a main plate secured to one of said corrugated elements having a perpendicular reinforcement section extending therefrom.

5. Anti-underride apparatus as set forth in claim 4 wherein said plate sections of said angular elements are bent at the areas of connections to said support beam until said corrugated elements are fully elongated free of corrugations.

6. Anti-underride apparatus as set forth in claim 5 wherein said underride apparatus provides a variable resistivity to forces produced by impact.

* * * * *